(12) United States Patent
Tenzek (10) Patent No.: US 7,507,087 B2
(45) Date of Patent: Mar. 24, 2009

(54) METHOD AND APPARATUS TO PROVIDE CONTINUOUS MOVEMENT THROUGH A FURNACE

(75) Inventor: Anthony M. Tenzek, Hanoverton, OH (US)

(73) Assignee: AJAX Tocco Manethermic Corporation, Cleveland, OH (US)

(*) Notice: Subject to any disclaimer, the term of this patent is extended or adjusted under 35 U.S.C. 154(b) by 99 days.

(21) Appl. No.: 11/418,586

(22) Filed: May 4, 2006

(65) Prior Publication Data

US 2007/0128568 A1 Jun. 7, 2007

Related U.S. Application Data

(60) Provisional application No. 60/749,320, filed on Dec. 7, 2005.

(51) Int. Cl.
*B65G 25/08* (2006.01)

(52) U.S. Cl. .................. 432/126; 432/121; 414/157; 414/198; 414/176; 198/747

(58) Field of Classification Search .............. 432/121, 432/126, 122, 153; 414/157, 198, 209, 210, 414/804, 150, 176; 198/468.6, 736, 741, 198/746, 747, 468.9
See application file for complete search history.

(56) References Cited

U.S. PATENT DOCUMENTS

| | | | |
|---|---|---|---|
| 1,851,913 A | | 3/1932 | Lange |
| 2,583,968 A | * | 1/1952 | Rosseau ................ 432/11 |
| 2,914,170 A | * | 11/1959 | Kent ................ 198/468.6 |
| 3,051,811 A | * | 8/1962 | Koesling ................ 432/126 |
| 3,137,485 A | * | 6/1964 | Johnson et al. ......... 432/126 |
| 3,375,941 A | * | 4/1968 | Repper, Jr. ............ 198/468.6 |
| 3,535,080 A | | 10/1970 | Van Der Pyl |
| 3,700,122 A | * | 10/1972 | Sevenich et al. ......... 414/156 |
| 3,708,157 A | * | 1/1973 | Aubry et al. ............ 432/126 |
| 3,804,584 A | * | 4/1974 | Herr ...................... 432/234 |
| 3,853,230 A | * | 12/1974 | Schultz ................ 414/564 |
| 4,117,252 A | | 9/1978 | McMaster |
| 4,412,816 A | * | 11/1983 | Schlumberger et al. ..... 414/150 |
| 4,689,009 A | * | 8/1987 | Heuss .................. 432/234 |
| 4,750,605 A | * | 6/1988 | Brems et al. ........... 198/468.8 |
| 4,825,069 A | | 4/1989 | Hutchisson et al. |
| 5,006,063 A | * | 4/1991 | Poggi et al. ............ 432/121 |
| 5,443,383 A | | 8/1995 | Kuehn |
| 5,899,317 A | * | 5/1999 | Chisaki ................ 414/198 |
| 6,422,798 B1 | * | 7/2002 | Lauinger et al. ......... 198/747 |
| 6,431,860 B1 | * | 8/2002 | Aono et al. ............ 432/126 |

*Primary Examiner*—Gregory A Wilson
(74) *Attorney, Agent, or Firm*—Sand & Sebolt (57) ABSTRACT

A pusher furnace includes a pusher assembly having first and second coordinated pushers for pushing load supports with loads to be heated thereon to provide continuous downstream movement of the load supports through a furnace section. A removal assembly includes a first removal mechanism which removes the load supports from the furnace section and a second removal mechanism which removes the loads from the first removal mechanism to facilitate the continuous downstream movement. The first removal mechanism preferably includes a parallelogram-type four-bar linkage for lifting the load supports and lowering them onto the second removal mechanism. Entry and exit plenums are connected to respective ends of the furnace section to provide a controlled atmosphere within the furnace section. The pusher and removal assemblies are timed with opening and closing of various gates of the plenums to maintain the controlled atmosphere.

41 Claims, 8 Drawing Sheets

METHOD AND APPARATUS TO PROVIDE CONTINUOUS MOVEMENT THROUGH A FURNACE

CROSS REFERENCE TO RELATED APPLICATIONS

This application claims priority from U.S. Provisional Application Ser. No. 60/749,320 filed Dec. 7, 2005; the disclosure of which is incorporated herein by reference.

BACKGROUND OF THE INVENTION

1. Technical Field

The invention relates generally to pusher furnaces. More particularly, the invention relates to a pusher furnace in which pusher plates are moved therethrough in a continuous manner. Specifically, the invention relates to loading and unloading mechanisms for providing such continuous movement of the pusher plates.

2. Background Information

Pusher furnaces are generally known in which a load to be heated is seated on a pusher plate which slides on rails extending through a heating chamber. However, many of these are indexing furnaces in which the pusher plate and load move in intermittent steps through the furnace. In addition, many pusher furnaces are relatively short. Yet there are certain types of products which require that a pusher furnace be both continuous and relatively long and include a heating section followed by a cooling section. Some of these products must also be fired at very high temperatures. For example, silicone carbide products fall in this category and more particularly diesel particulate filters. Production of products such as these require heating of the load in a series of heating zones having different temperature ranges which are closely controlled. Thus, there is a need in the art for an extremely long pusher furnace which is capable of firing to very high temperatures and which moves the loads therethrough in a continuous manner. As a result, there is a need for continuous loading and unloading mechanisms which can ensure that the loads are moved through the furnace in a continuous manner, as opposed to an indexing furnace wherein as the load briefly stops, it continues to absorb heat which may result in surface or interior temperatures which are higher than allowable to achieve a successful product.

BRIEF SUMMARY OF THE INVENTION

The present invention provides a pusher furnace comprising a furnace section having entry and exit ends; a plurality of load supports adapted to support respective loads to be heated in the furnace section; and a pusher assembly adjacent the entry end of the furnace section for pushing the load supports to provide continuous downstream movement of the load supports from adjacent the entry end to adjacent the exit end of the furnace section.

The present invention also provides a method comprising the steps of pushing a plurality of load supports with respective loads thereon in a continuous manner from adjacent an entry end to adjacent an exit end of a furnace section; and heating the load supports and loads within the furnace section.

BRIEF DESCRIPTION OF THE SEVERAL VIEWS OF THE DRAWINGS

Similar numbers refer to similar parts throughout the drawings.

DETAILED DESCRIPTION OF THE INVENTION

Figure 1:
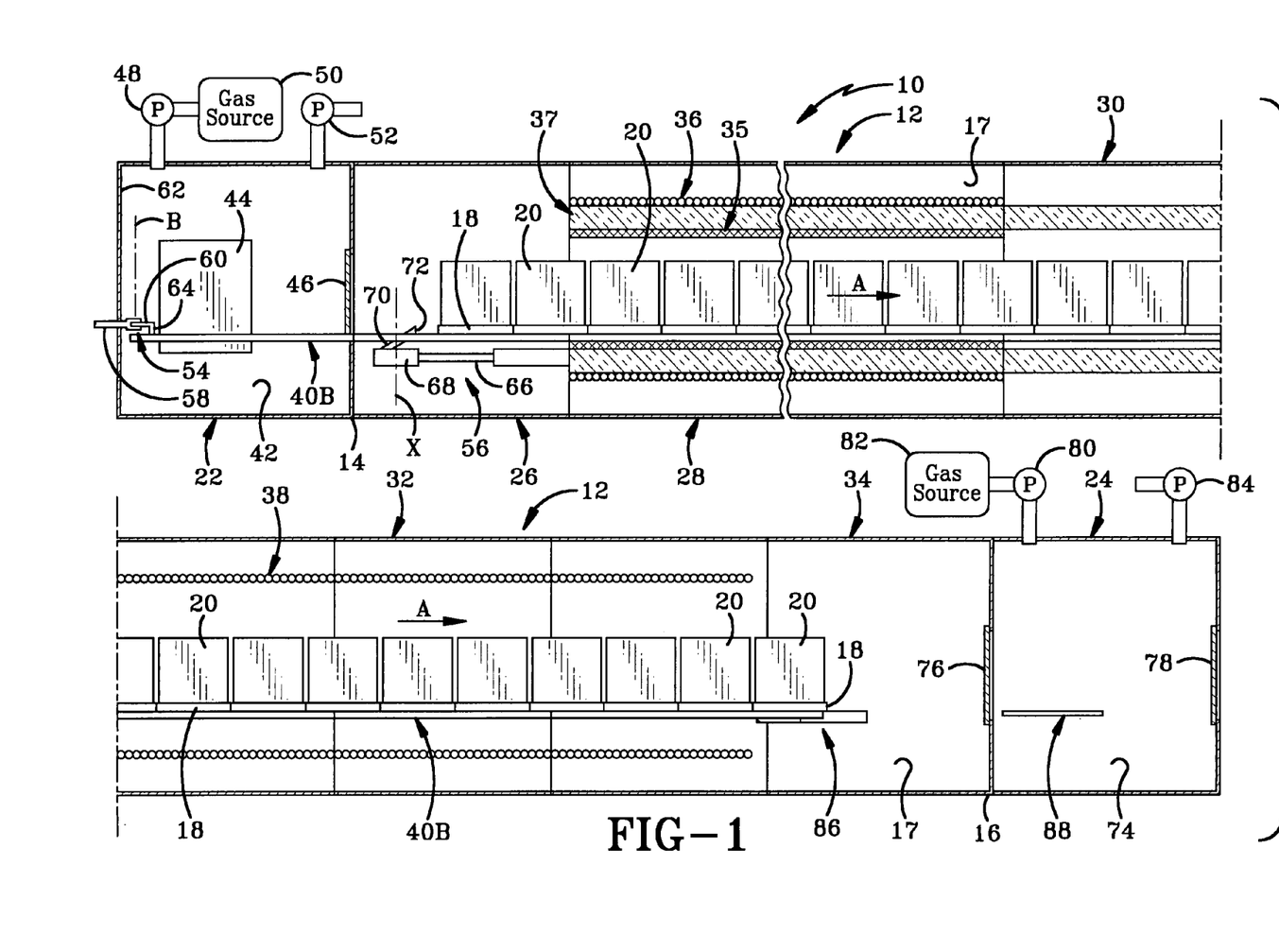
FIG. 1 is a diagrammatic side elevational view of the pusher furnace of the present invention.

The pusher furnace of the present invention is indicated generally at 10 in FIG. 1. Furnace 10 includes a sealed section 12 which has a first or entry end 14 and a second or exit end 16 through which a plurality of load supports in the form of pusher plates 18 with loads 20 thereon are moved from first end 14 to second end 16 in order to heat and cool loads 20 therein. Furnace 10 further includes an entry plenum 22 connected to sealed section 12 at first end 14 and an exit plenum 24 connected to sealed section 12 at second end 16 thereof. Sealed section 12 includes an entry transition section 26 adjacent entry plenum 22, a heating section 28 in communication with transition section 26, a holding zone 30 in communication with heating section 28, a cooling section 32 in communication with holding zone 30 and an exit transition section 34 which is in communication with cooling section 32 and disposed adjacent exit plenum 24.

Heating section 28 typically includes multiple individual heating sections each of which include an induction coil 36 and a susceptor 35 with insulation 37 therebetween in order to provide inductive heat for heating loads 20 as they move through heating section 28. Furnace 10 may also include a preheat section (not shown) which is, for example heated by resistance heaters. In the exemplary embodiment, heating section 28 includes a plurality of heating zones each of which has a different temperature range or temperature gradient which is closely controlled in order to provide a specific temperature profile for loads 20 as they pass through furnace 10. Cooling section 32 includes cooling rings or pipes 38 through which water or another coolant is pumped in order to provide cooling to loads 20 as they pass through cooling section 32. Cooling section 32 may also be divided into cooling zones to provide a highly controlled heat exchange during cooling of loads 20. A pair of axially spaced parallel slide rails 40A (FIG. 3) and 40B extend from within entry plenum 22 through all of the sections within sealed section 12 and into exit transition section 34 whereby pusher plates 18 are slid atop slide rails 40A and 40B through the furnace in the longitudinal downstream direction indicated at Arrow A.

Figure 2:
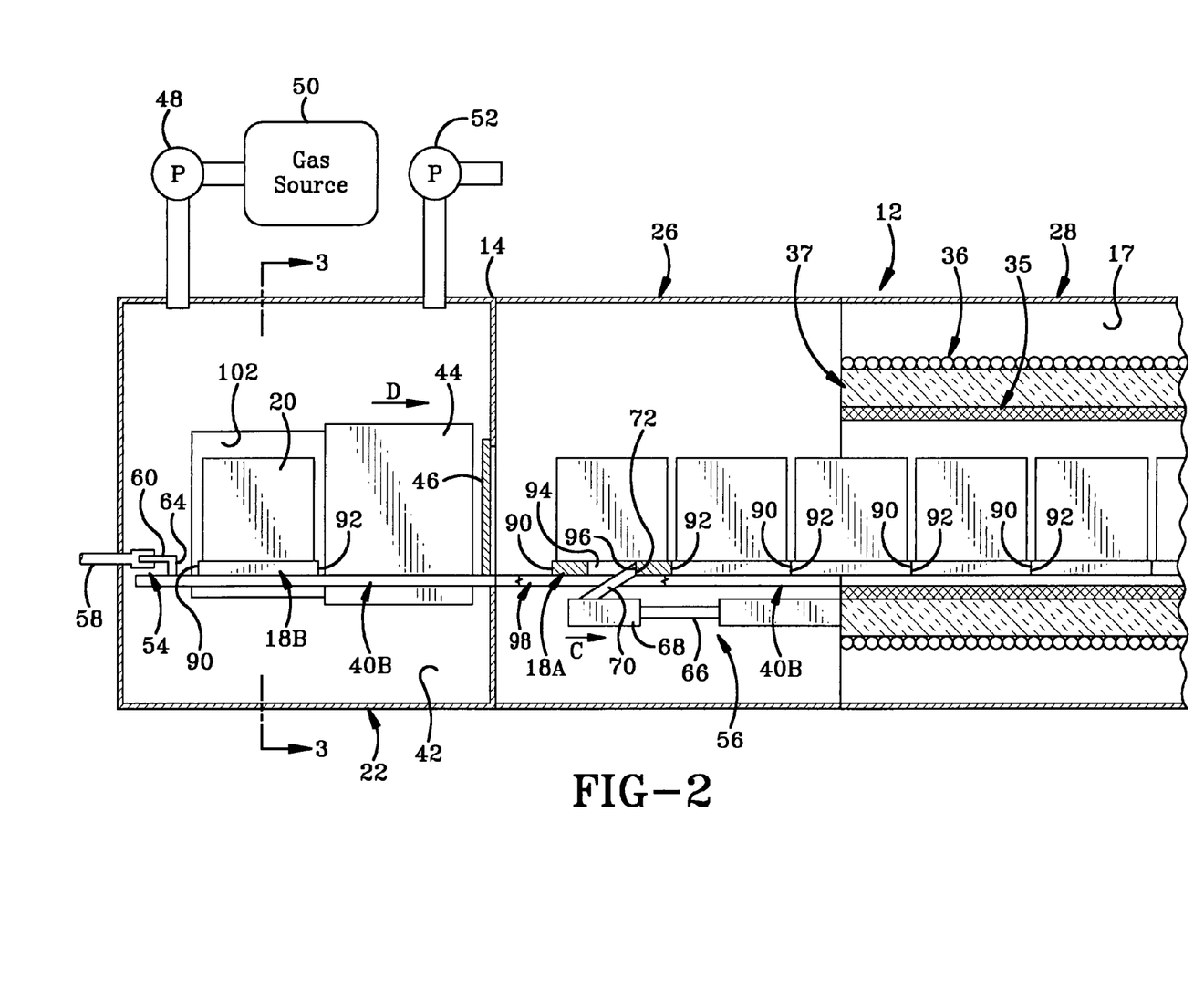
FIG. 2 is an enlarged fragmentary view of a portion of FIG. 1 showing the entry plenum, entry transition section, an upstream end portion of the furnace section and the pusher assembly with a pusher plate having a load thereon prior to entry into the entry plenum via the entry gate thereof.

Entry plenum 22 defines an interior chamber 42 and includes a plenum entry gate 44 which is moveable between closed and open positions as represented respectively in FIGS. 1 and 2 to respectively provide a seal between interior chamber 42 and atmosphere external to plenum 22, and to provide communication between chamber 42 and said external atmosphere. A furnace entry gate 46 is disposed at the boundary between plenum 22 and entry transition section 26 and is openable and closable to respectively provide communication between interior chamber 42 and interior chamber 17 of section 12, and to provide a seal between said chambers 42 and 17. A first pump 48 is in communication with interior chamber 42 and the gas source 50 for pumping an inert gas such as argon or helium into interior chamber 42. Nitrogen gas is another suitable option. A second pump 52 is also in communication with interior chamber 42 in order to evacuate air from the chamber.

In accordance with the invention, furnace 10 includes a continuous loading mechanism for loading pusher plates 18 and loads 20 into furnace 10 in a continuous manner to facilitate continuous movement of pusher plates 18 and loads 20 through furnace 10. The loading mechanism includes a continuous pusher assembly which includes a first pusher mechanism 54 and a second pusher mechanism 56. First pusher mechanism 54 includes a pusher arm 58 and a swivel head 60 which is rotatable about a substantially vertical axis B. Arm 58 extends through an opening in an end wall 62 of plenum 22 in a sealed manner so that first pusher mechanism 54 is able to move back and forth in a longitudinal direction of the furnace while maintaining plenum 22 in a sealed condition. Swivel head 60 has a pushing surface 64 at a downstream end thereof.

Figure 4:
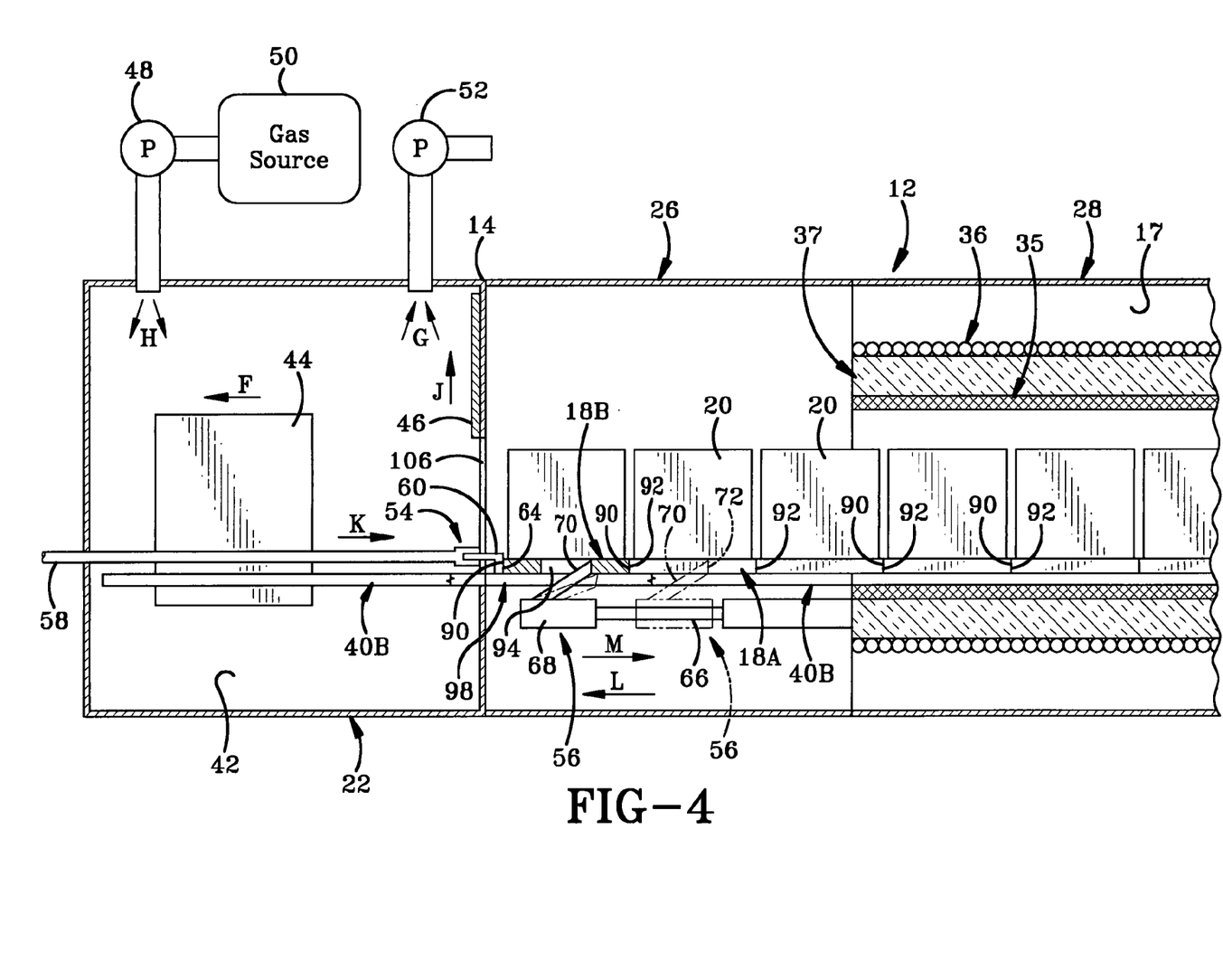
FIG. 4 is similar to FIG. 2 and shows the first pusher mechanism of the pusher assembly having pushed a pusher plate with a load thereon into the transition section and the second pusher mechanism having moved to a position to begin pushing the same pusher plate.

Second pusher mechanism 56 includes an extendable-retractable arm 66 with a swivel head 68 mounted thereon which is rotatable about a substantially vertical axis X. Arm 66 may be configured to extend from entry plenum 22 into transition section 26. A pair of axially spaced pushing members in the form of shoes 70 (only one shown) are pivotally mounted on head 68 to pivot about a substantially horizontal axis between raised and lowered positions (FIG. 4). Shoe 70 includes a pushing surface 72 disposed at its downstream end.

At the downstream end of the furnace, exit plenum 24 defines an interior chamber 74. A furnace exit gate or exit plenum entry gate 76 is disposed between exit plenum 24 and exit transition section 34 to provide a seal between the two in a closed position and provide communication between interior chamber 74 and interior chamber 17 in an open position. Plenum 24 includes plenum exit gate 78 which provides a seal between interior chamber 74 and external environment in a closed position and fluid communication therebetween in an open position. A third pump 80 is in fluid communication with interior chamber 74 and a gas source 82 for pumping an inert gas such as argon or helium into interior chamber 74. A fourth pump 84 is also in fluid communication with interior chamber 74 for evacuating air therefrom. In accordance with the invention, furnace 10 includes a removal assembly which includes a first removal mechanism 86 which is disposed in transition section 34 and a second removal mechanism 88 which is moveable within transition section 34, plenum 24 and external to plenum 24 via gates 76 and 78. The removal assembly is used to remove the pusher plates 18 and loads 20 from slide rails 40 and from the interior chambers of furnace 10. The removal assembly will be described in greater detail further below.

Figure 3:
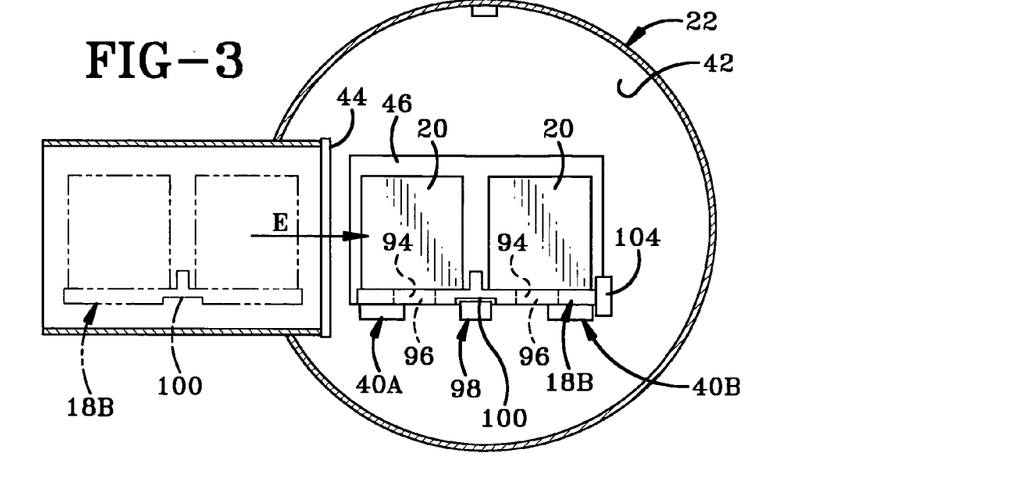
FIG. 3 is a sectional view taken on line 3-3 of FIG. 2.

With reference to FIGS. 2 and 3, the pusher assembly and pusher plates are further described. As seen in FIG. 2, each pusher plate 18 includes an upstream end 90 a portion or all of which serves as a first pushing surface. Each pusher plate 18 includes a downstream end 92 opposed to upstream end 90 so that as pusher plates 18 are being pushed through the furnace, the downstream end 90 of each pusher plate 18 engages the upstream end 92 of an adjacent pusher plate 18 which is downstream thereof. FIG. 2 shows one of the pusher plates disposed in transition section 26 is designated 18A and shown in section to show formed therein one of a pair of axially spaced openings 94 (both shown in FIG. 3) which extends upwardly from a bottom surface of each pusher plate 18. The downstream end of each opening 94 is bounded by a substantially vertical second pushing surface 96 which pushing surface 72 of shoe 70 engages in order to push pusher plate 18A and the remaining pusher plates within section 12 along slide rails 40A and B.

In FIG. 2, a portion of slide rail 40B is cut away to show a central guide rail 98 which is disposed between slide rails 40A and 40B and runs parallel thereto along the length of said slide rails. FIG. 3 further shows that each pusher plate 18 defines a longitudinally extending guide slot 100 which extends upwardly from a lower surface of each pusher plate 18 and receives therein a portion of guide rail 98. The upper surface of guide rail 98 is spaced downwardly from the portion of pusher plate 18 forming the upper boundary of slot 100 so that as pusher plates 18 move through furnace 10, pusher plates 18 will only contact guide rail 98 along the vertical lateral edges thereof. Guide slot 100 is of a bow tie configuration which is not shown but is described in detail in co-pending patent application having Ser. No. 60/749,016 and entitled Guidance System For Pusher Plate For Use In Pusher Furnaces, which was filed on Dec. 7, 2005 and is incorporated herein by reference.

With reference to FIGS. 2-5, the operation of the pusher assembly and related aspects is described. The figures in general represent the operation of furnace 10 with pusher plates 18 and loads 20 extending all the way through the furnace and thus in the midst of a continuously cycling operation. In keeping with the continual operation of furnace 10, a conveyor mechanism (not shown) is utilized to return pusher plates 18 once they exit furnace 10 back to entry plenum 22, which is where the process is described initially with reference to FIG. 2. FIG. 2 shows that second pusher mechanism 56 is pushing (Arrow C) pusher plate 18A and the other pusher plates 18 downstream thereof along slide rails 40A and 40B through the substantially entire distance of section 12. More particularly, shoe 70 is in the raised position with pushing surface 72 thereof engaging second pushing surface 96 of pusher plate 18A. Meanwhile, entry gate 44 of plenum 22 has moved to its open position as indicated by Arrow D to provide access from external to plenum 22 to interior chamber 42 via entry opening 102. After door 44 opens, a pusher plate designated as 18B is moved from external to plenum 22 into interior chamber 42 as indicated by Arrow E in FIG. 3. Pusher plate 18B comes to rest against an axially aligning guide 104 which is used for aligning pusher plate 18B with guide rail 98 and the opening into section 12.

Then, as shown in FIG. 4, entry gate 44 is closed as shown at Arrow F to seal interior chamber 42 of plenum 22, at which time air is evacuated as indicated at Arrows G via pump 52. Subsequently, an inert gas such as argon or helium is pumped from gas source 50 via pump 48 into interior chamber 42 as indicated at Arrows H to provide a suitable atmosphere to maintain the appropriate inert atmosphere within interior chamber 17 when gate 46 is opened as indicated at Arrow J to provide communication between chambers 17 and 42 via entrance opening 106. First pusher mechanism 54 then pushes pusher plate 18B in the longitudinal downstream direction indicated at Arrow K until downstream end 92 of pusher plate 18B contacts upstream end 90 of pusher plate 18A. The force applied in the direction of Arrow K by first pusher mechanism 54 increases until first pusher mechanism 54 is applying a sufficient force to push all of pusher plates 18 along slide rails 40 throughout the furnace. As the force applied by first pusher mechanism 54 reaches a sufficient level, second pusher mechanism 56 will cease pushing second pushing surface 96 of pusher plate 18A, either based on a timing mechanism or by sensing a decreased need for second pusher mechanism 56 to supply force in light of the increased force applied by first pusher mechanism 54. Then, while first pusher mechanism 54 continues to push the entire series of pusher plates 18 through the furnace, second pusher mechanism 56 moves as indicated at Arrow L from the position shown in dot dashed lines below pusher plate 18A to the position shown in solid lines below pusher plate 18B.

During this movement, shoe 70 moves from the raised position to the lowered position shown in dot dashed lines below pusher plate 18B. Preferably, shoe 70 is spring biased to the raised position so that during the movement from the position below plate 18A to the position below plate 18B, a portion of plate 18A bounding opening 94 therein contacts and forces shoe 70 downwardly against the spring bias to the lowered position and the upper tip of shoe 70 slides along the lower surface of plates 18A and 18B until the spring bias forces shoe 70 upwardly into opening 94 of plate 18B. At this point, second pusher mechanism 56 begins to move and apply force in the direction of Arrow M to plate 18B and the downstream pusher plates as well in order to take over the entire load from first pusher mechanism 54.

Figure 5:
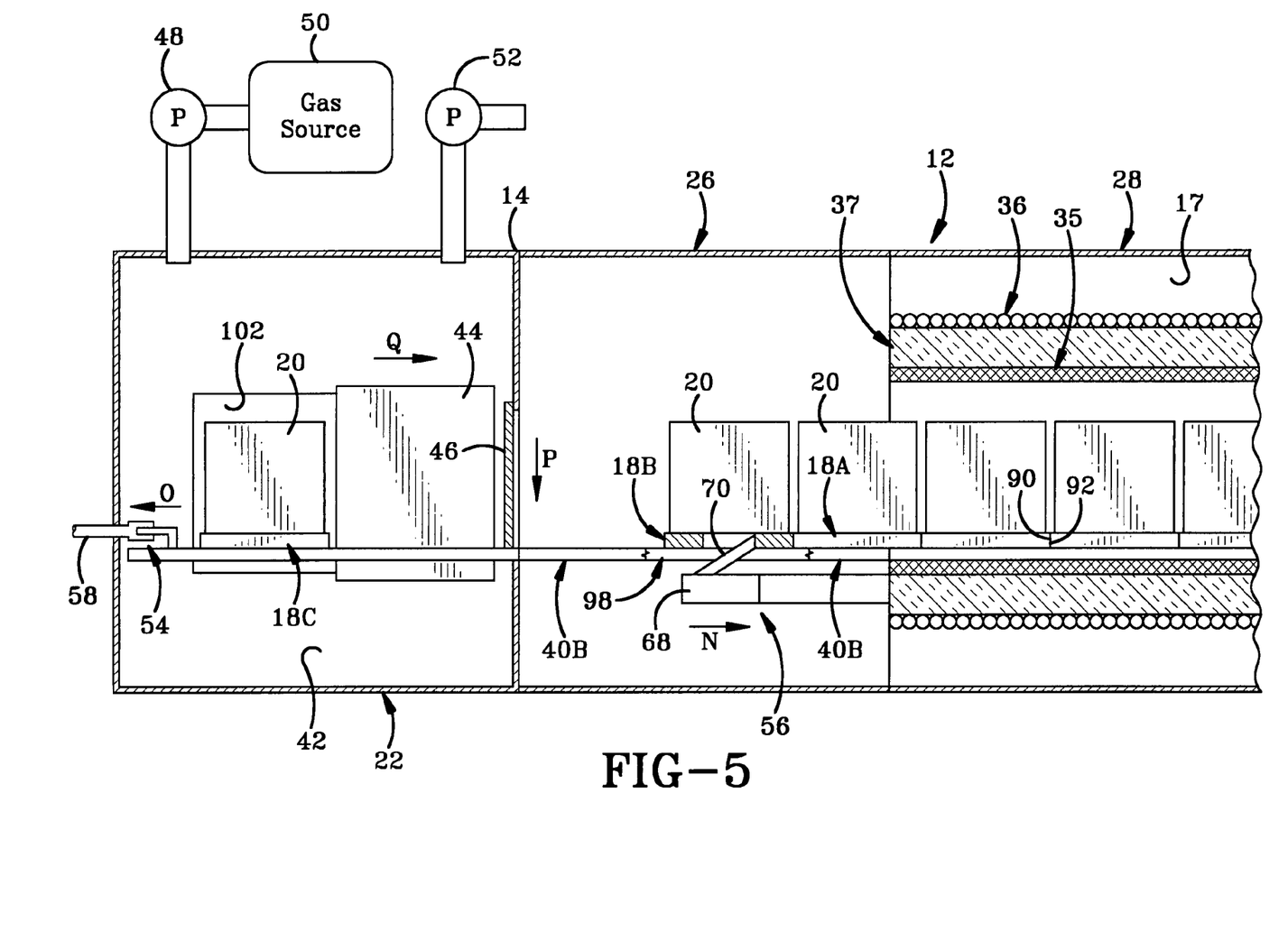
FIG. 5 is similar to FIG. 4 and shows the second pusher mechanism continuing to push the initial pusher plate and the first pusher mechanism moving back into the entry plenum in preparation to pushing an additional pusher plate with a load thereon into the transition section.

Once second pusher mechanism 56 picks up the entire load of pusher plates within furnace section 12 and continues to push them as indicated at Arrow N in FIG. 5, first pusher mechanism 54 returns to its starting position as indicated at Arrow O. Thus, second pusher mechanism 56 hands off or transfers the required pushing of the entire series of pusher plates 18 and loads 20 thereon within section 12 to first pusher mechanism 54 as illustrated in FIG. 4 and first pusher mechanism 54 likewise transfers the pushing requirement back to second pusher mechanism 56, these processes being done in a seamless fashion in order to provide continuous movement of pusher plates 18 and loads 20 through furnace 10. In order to provide the appropriate timing for this process to occur, first pusher mechanism 54 generally must move faster than the second pusher mechanism 56 in order to move a given pusher plate 18 into position within transition section 26 and return to its starting position within entry plenum 22 to pick up an additional pusher plate and load thereon. Once first pusher mechanism 54 has returned to entry plenum 22, gate 46 closes as indicated by Arrow P in order to seal interior chamber 17 and subsequently gate 44 opens as indicated at Arrow Q in order that a subsequent pusher plate 18C may enter plenum 22 to begin the process again.

In accordance with the invention, furnace 10 includes an unloading mechanism which includes the removal assembly noted previously. The removal assembly is now described with reference to FIGS. 6-9. First removal mechanism 86 is in the form of a pair of parallelogram-type four-bar linkages which share a common bar or plate 108 as a support member for supporting a pusher plate 18 thereon for removal thereof from slide rails 40. More particularly, the four-bar linkages include respective stationary base bars 110A and 110B, respective first lateral bars 112A and 112B and respective second lateral bars 114A and 114B. Support plate 108 and base bars 110 are substantially parallel to one another and lateral bars 112 and 114 are substantially parallel to one another. Each lateral bar 112 and 114 is pivotally connected to support plate 108 and pivotally connected to a respective base bar 110. A powered drive (not shown) powers first removal mechanism 86 in order to pivot support plate 108 about pivotal connections with lateral bars 112 and 114 and to pivot lateral bars 112 and 114 about pivotal connections with base bars 110 so that support plate 108 revolves generally about base bars 110.

Figure 9:
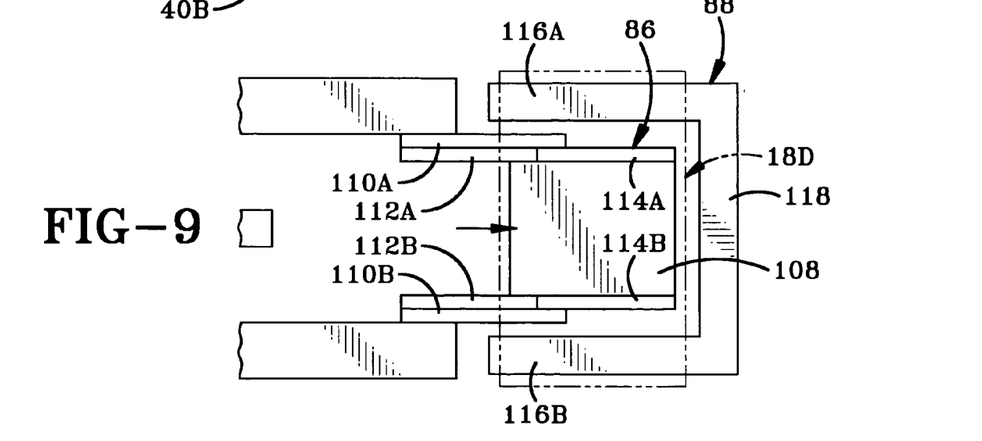
FIG. 9 is similar to FIG. 7 and shows the first and second removal mechanisms in the transfer position shown in solid lines in FIG. 8.

Referring to FIG. 9, second removal mechanism 88 generally known as a tongue pusher includes a pair of spaced forks 116A and 116B which extend upstream in the longitudinal direction from an intervening axially extending base 118. A drive mechanism or actuator (not shown) moves second removal mechanism 88 back and forth in the longitudinal direction in a substantially horizontal manner.

Figure 6:
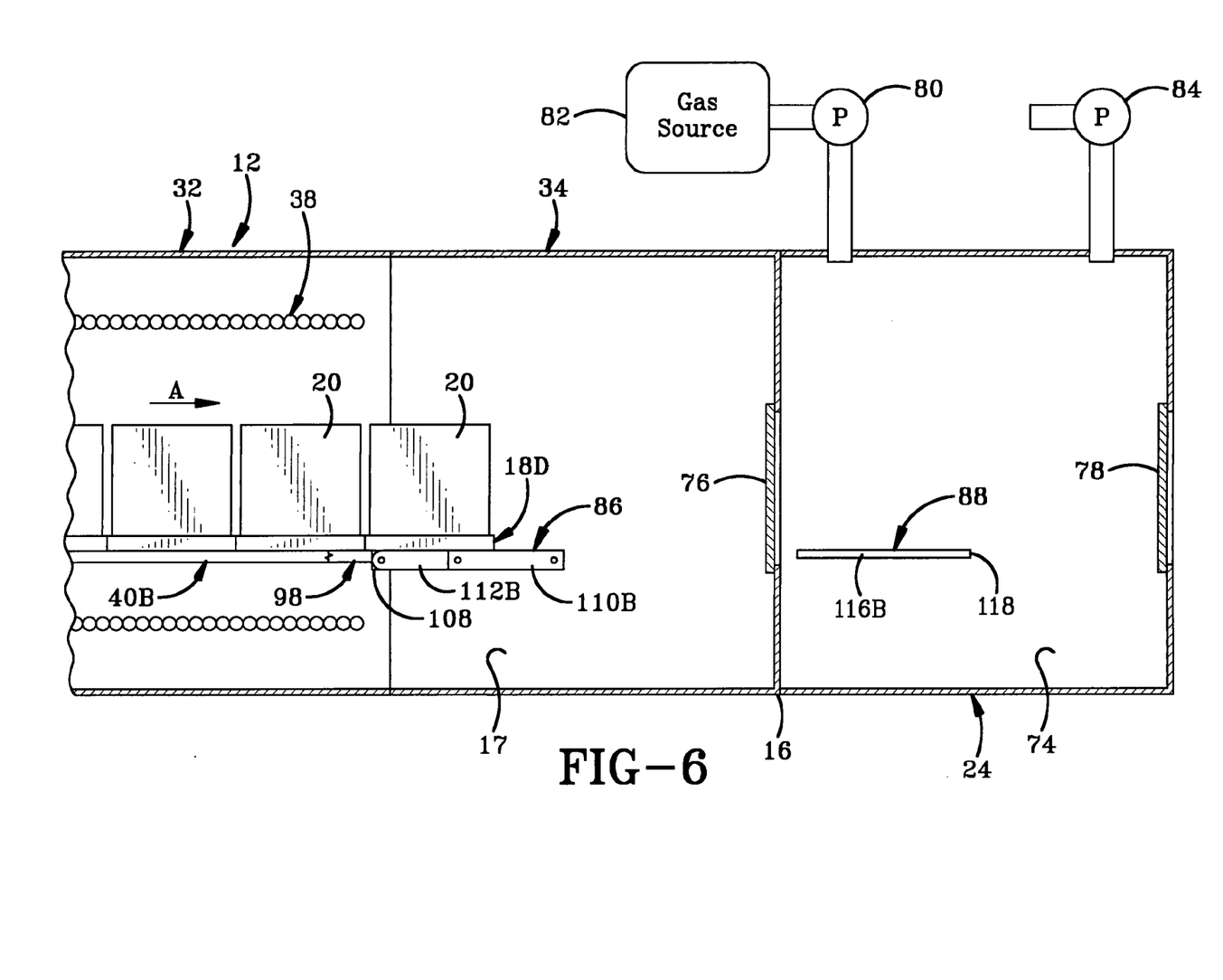
FIG. 6 is an enlarged fragmentary view of a portion of FIG. 1 showing a downstream end portion of the furnace section, the exit transition section and the exit plenum with the first removal mechanism of the removal assembly in the transition section and the second removal mechanism in the exit plenum prior to the first removal mechanism removing the most downstream pusher plate from slide rails in the furnace section.
Figure 7:
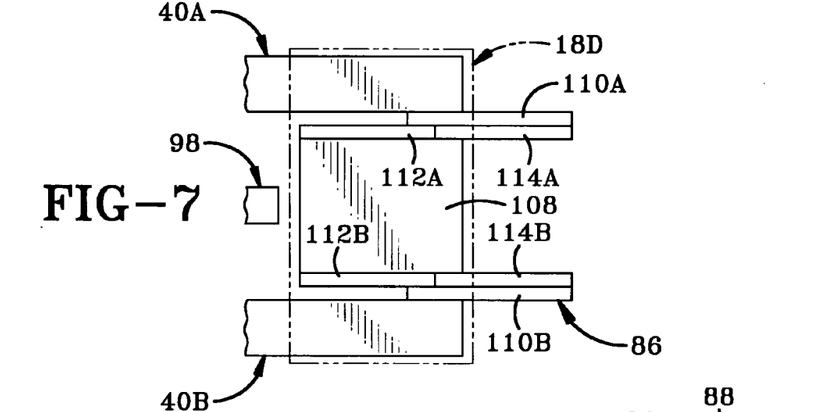
FIG. 7 is an enlarged fragmentary top plan view of the first removal mechanism showing the pusher plate in dot dashed lines.
Figure 8:
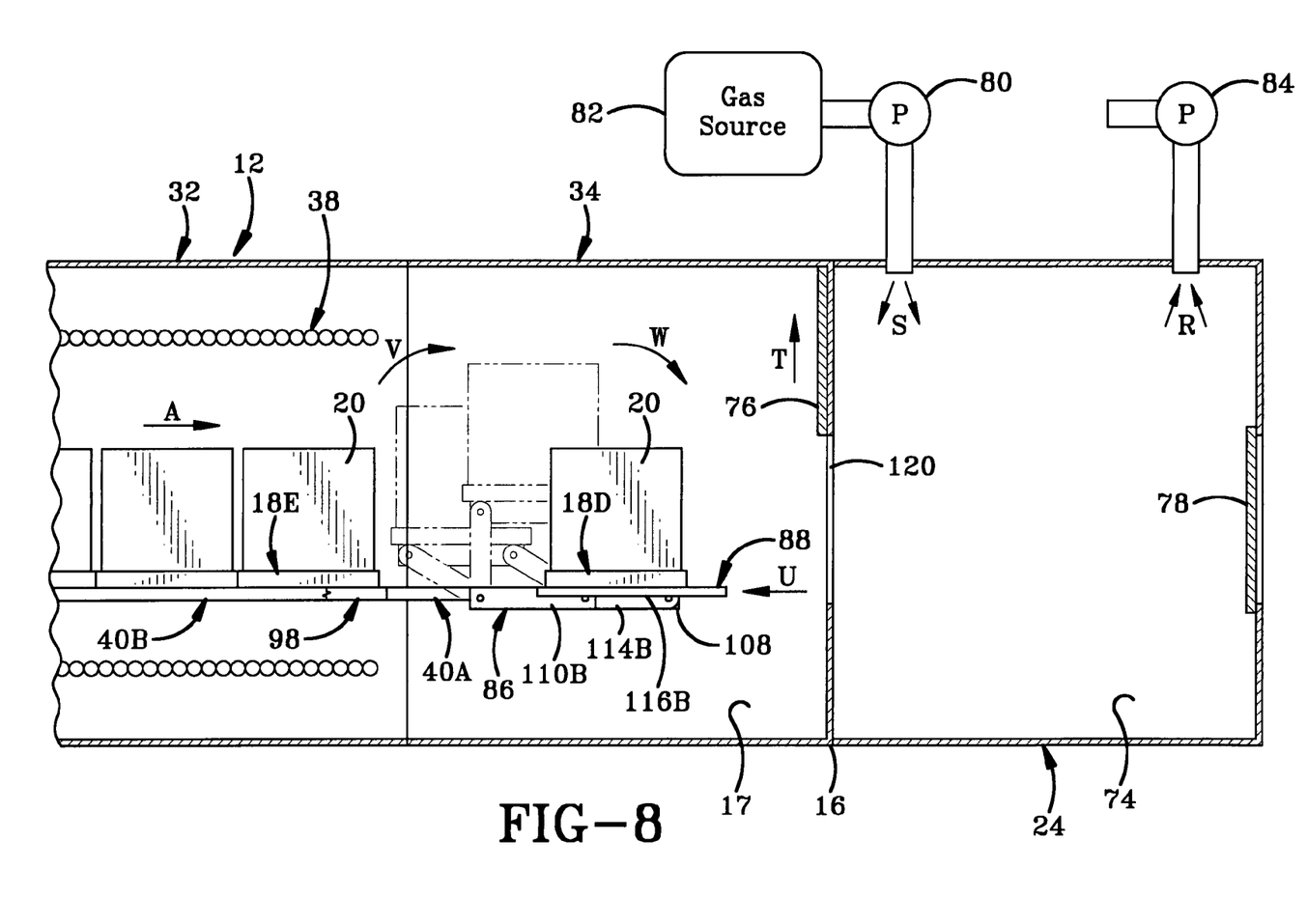
FIG. 8 is similar to FIG. 6 and shows in dot dashed lines lifting and downstream movement of the first removal mechanism with the pusher plate and load thereon to a transfer position shown in solid lines in which the first removal mechanism is setting the pusher plate and load on the second removal mechanism which has moved into the exit transition section.

With reference to FIGS. 6-10, the operation of the removal assembly is described. FIGS. 6 and 7 show first removal mechanism 86 prior to removal of a pusher plate designated 18D from slide rails 40A and 40B. In this position, support plate 108 and first lateral bars 112 are disposed below pusher plate 18D and between rails 40A and 40B. Referring to FIG. 8, fourth pump 84 evacuates air from interior chamber 74 of exit plenum 24 as indicated at Arrows R and third pump 80 pumps inert gas such as argon or helium from source 82 into interior chamber 74 as indicated at Arrows S. Subsequently, gate 76 is opened as indicated at Arrow T to provide access via an opening 120 between interior chamber 74 of exit plenum 24 and interior chamber 17 within transition section 34 of section 12. Once gate 76 is opened, second removal mechanism 88 moves as indicated at Arrow U from its position within plenum 24 (FIG. 6) into transition section 34. Meanwhile, first removal mechanism 86 has been operated in order to lift pusher plate 18D from rails 40 and move pusher plate 18D longitudinally in a downstream direction as indicated by Arrow V and to continue in the downstream direction and to lower pusher plate 18D as indicated at Arrow W onto forks 116 of second removal mechanism 88.

Figure 10:
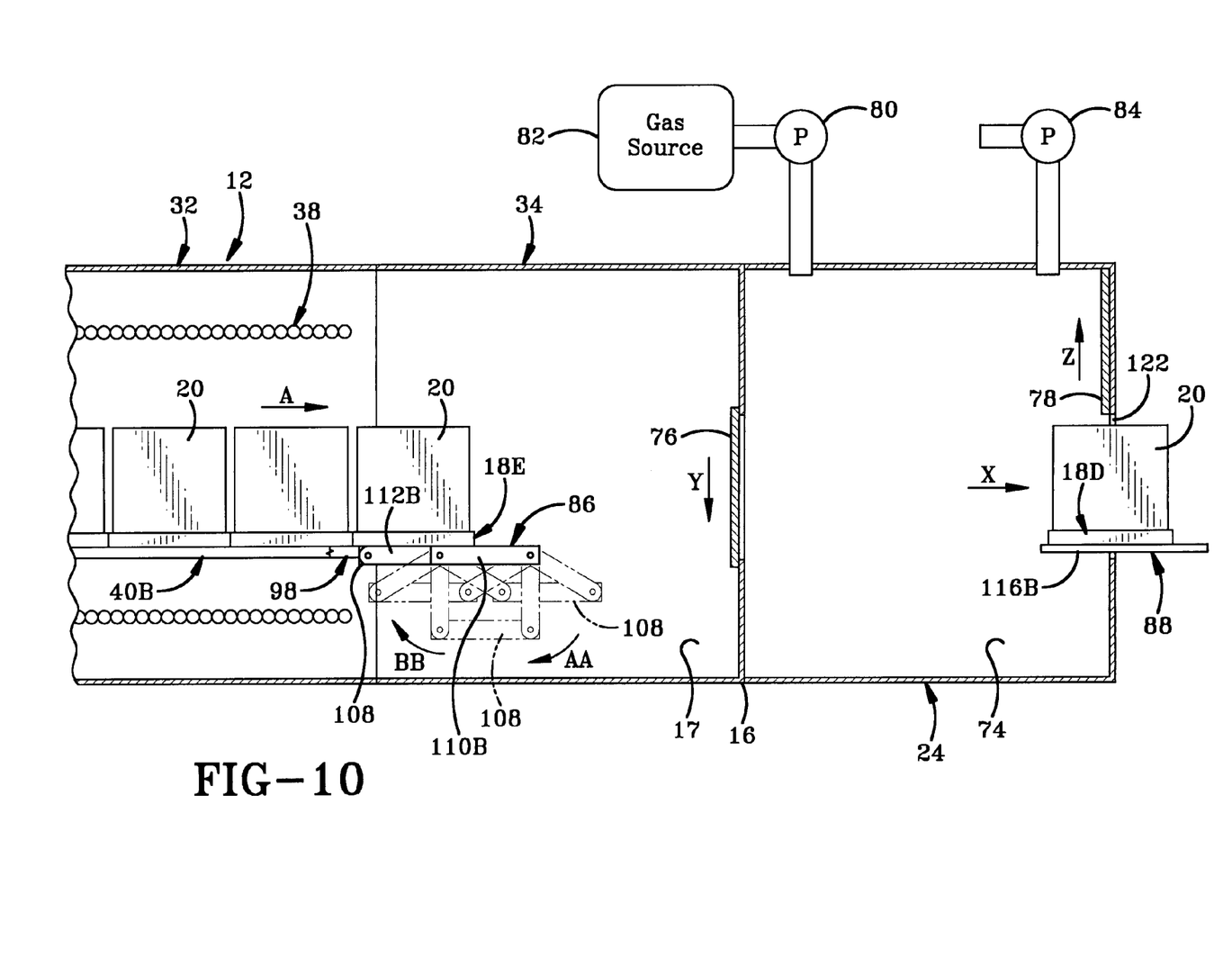
FIG. 10 is similar to FIG. 8 and shows in dot dashed lines the first removal mechanism cycling downwardly and upwardly back to its original position shown in FIG. 6 in preparation to picking up an additional pusher plate and load thereon while the formerly removed pusher plate and load is being removed from the exit plenum by the second removal mechanism.

With reference to FIG. 10, once first removal mechanism 86 has handed off or transferred pusher plate 18D to second removal mechanism 88 at a transfer location, first removal mechanism 86 returns to its pickup position to pick up a subsequent pusher plate designated 18E while second removal mechanism 88 removes pusher plate 18D from transition section 34 into exit plenum 24 via opening 120 and from plenum 24 to a position external plenum 24 via an exit opening 122. More particularly, second removal mechanism 88 moves as indicated by Arrow X first into plenum 24 at which point gate 76 moves to its closed position as indicated by Arrow Y to provide a seal between chambers 17 and 74. Exit gate 78 is then opened as indicated at Arrow Z to allow pusher plate 18D and load 20 thereon to move from interior chamber 74 to a position external to plenum 24 via exit opening 122. Meanwhile, the return movement of first removal mechanism 86 to its pick up position (FIGS. 6-7) includes the downward and longitudinally upstream movement of support plate 108 as indicated by Arrow AA and continuing longitudinal upstream movement and upward movement of support plate 108 as indicated at Arrow BB.

Similar to the pusher assembly, the removal assembly includes two mechanisms wherein one must move a good deal faster than the other in order to provide the continuous removal of pusher plates 18 which allows the continuous movement of pusher plates 18 along slide rails 40. More particularly, second removal mechanism 88 must move relatively quickly in and out of exit plenum 24 and transition chamber 34 in order to be in its pickup position shown in FIG. 8 for the transfer of a pusher plate from first removal mechanism 86. In addition, the opening and closing of gates 76 and 78 along with the operation of pumps 80 and 84 must be properly timed in order to allow the removal of the respective pusher plates 18 while maintaining the proper atmosphere of inert gas within interior chamber 17 at all times.

Pusher furnace 10 thus operates in a continuous manner to provide continuous movement of pusher plates 18 and loads 20 thereon along slide rails 40. This is accomplished in part by the pusher assembly and the removal assembly which are carefully timed in order to keep pusher plates 18 moving along slide rails 40 without stopping and removing them in a continuous manner as well. The continuous movement of pusher plates 18 and loads 20 through furnace 10 allows the energy absorbed by the loads 20 during heating to be continuous and proportional to the speed at which they move. This non-stop movement of the loads thus prevents a thermal or temperature spike within any portion of the load. Similarly, when the loads are traveling through cooling section 32, the thermal energy given off by the loads will likewise be continuous and proportional to the speed of movement in order to provide an even cooling gradient.

In the thermal processing provided in push furnace 10, it may be required that certain chemical reactions take place as a function of temperature and that those reactions take place uniformly along defined isotherms. Transient conditions which may occur in a non-continuous pusher furnace may distort the place and time that such chemical reactions take place. Such distortions promote thermal stresses which can cause eventual mechanical fracture during either the heating or cooling cycles. The continuous movement of loads 20 through pusher furnace 10 prevents such transient conditions in order to control the timing and location of these chemical reactions.

Another advantage of pusher furnace 10 which results from the continuous movement thereof is that pusher plates 18 are limited only to dynamic friction along slide rails 40. Thus, a force requirement necessary to move plates 18 and loads 20 through furnace 10 are constant as a function of temperature and thus prevent the jerking type of movements that could negatively affect loads 20.

While furnace 10 may be useful in a variety of settings, it is particularly useful when the loads to be heated and cooled therein require a thermal profile which cannot deviate from a set point or thermal ramp rate by more than a few degrees. In addition, furnace 10 is configured to provide a system which is continuously operable for extended periods of time, preferably for many months without ceasing.

In keeping with this extended continuous operation, careful alignment of the susceptor, slide rails and other related structure is important. To that effect, the disclosure of copending patent application having Ser. No. 60/748,819 and entitled Furnace Alignment System filed on Dec. 7, 2005 is incorporated herein by reference. In addition, particularly with regard to such a long furnace (for example, roughly 50 to 70 feet), a method of controlling the expansion and contraction of the susceptor, insulation and related structure is also important. To that effect, the disclosure in the copending patent application having Ser. No. 60/748,872 and entitled Method And Apparatus For Controlling Furnace Position In Response To Thermal Expansion filed on Dec. 7, 2005 is incorporated herein by reference. Further, where inductive heating is utilized and the heating section includes various distinct heating zones which must be closely controlled, is important to be able to independently control the inductive heating within those heating zones. To that effect, a disclosure of the copending patent application having Ser. No. 60/749,015 and entitled Induction Coil Having Internal And External Faradic Rings filed on Dec. 7, 2005 is incorporated herein by reference.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A pusher furnace comprising:
   a furnace section having entry and exit ends;
   a plurality of load supports adapted to support respective loads to be heated in the furnace section; and
   a pusher assembly adjacent the entry end of the furnace section for pushing the load supports to provide continuous downstream movement of the load supports from adjacent the entry end to adjacent the exit end of the furnace section; and
   wherein the pusher assembly includes first and second pusher mechanisms which move in a coordinated manner to provide continuous movement of the load supports through the furnace section; and
   the first pusher mechanism includes an extendable-retractable arm and a first pusher member which is rotatably mounted on the arm to rotate laterally and which selectively engages the load supports.

2. The furnace of claim 1 wherein the second pusher mechanism includes an extendable-retractable arm and a second pusher member which is movably mounted on the arm to move upwardly and downwardly and which selectively engages the load supports.

3. The furnace of claim 2 wherein the second pusher member is movable upwardly to a pushing position for engaging the load supports and downwardly to a non-pushing position.

4. The furnace of claim 1 wherein each load support has first and second pushing surfaces; wherein the first pusher mechanism is configured for pushing the load supports via contact with the first pushing surface and the second pusher mechanism is configured for pushing the load supports via contact with the second pushing surface.

5. The furnace of claim 4 wherein the pusher member is movable between a pushing position in which the pusher member engages the second pushing surface of a first one of the load supports and a non-pushing position in which the pusher member is movable from adjacent the second pushing surface of the first load support to adjacent the second pushing surface of a second one of the load supports upstream of the first load support.

6. The furnace of claim 4 wherein each load support has a lower surface and defines an opening which extends upwardly from the lower surface; and wherein the second pushing surface bounds the opening.

7. The furnace of claim 1 further including a removal assembly for removing the load supports from the exit end of the furnace section in a manner to facilitate the continuous movement of the load supports.

8. The furnace of claim 7 wherein the removal assembly includes a first removal mechanism adjacent the exit end of the furnace section for removing the load supports from the furnace section and a second removal mechanism for removing the loads from the first removal mechanism.

9. The furnace of claim 8 wherein the first removal mechanism includes a first support member which is movable upwardly for lifting the load supports to remove them from the furnace section.

10. The furnace of claim 9 wherein the second removal mechanism includes a second support member; wherein the first support member is movable downwardly to a position adjacent the second support member for lowering the load supports onto the second support member.

11. The furnace of claim 10 wherein the second removal mechanism includes an extendable-retractable arm for moving the second support member in a back and forth motion.

12. The furnace of claim 9 wherein the first removal mechanism includes a parallelogram-type four-bar linkage.

13. The furnace of claim 1 wherein a guide rail extends through the furnace section; wherein each load support has a lower surface and defines a guide slot which extends upwardly from the lower surface; and wherein the guide rail is disposed in the guide slot of each load support during movement thereof through the furnace section.

14. The furnace of claim 1 further comprising a slide rail within the furnace section extending from adjacent the entry end to adjacent the exit end; and a sliding engagement between each of the load supports and the slide rail which is continuous from adjacent the entry end to adjacent the exit end.

15. The furnace of claim 1 further comprising
an entry plenum adjacent the entry end of the furnace section;
a furnace section entrance opening formed between the entry plenum and the furnace section;
a furnace entry gate which is openable to provide communication between the entry plenum and furnace section via the furnace section entrance opening and closable to provide a seal between the entry plenum and furnace section;
a first pushing surface on the first pusher mechanism which engages the load supports during the respective pushing thereof and which is within the furnace section whenever the furnace entry gate is closed.

16. The furnace of claim 15 wherein the first pushing surface is within the furnace section at all times of operation.

17. The method of claim 1 wherein the second pusher mechanism includes an extendable-retractable arm and a second pusher member which is rotatably mounted on the arm to rotate laterally and which selectively engages the load supports.

18. A method comprising the steps of:
pushing a plurality of load supports with respective loads thereon in a continuous manner from adjacent an entry end to adjacent an exit end of a furnace section; and
heating the load supports and loads within the furnace section; and wherein the step of pushing includes the step of coordinating movement of first and second pusher mechanisms to provide continuous movement of the load supports through the furnace section; and
the step of coordinating includes the step of pushing a first one of the load supports downstream with the second pusher mechanism while pushing the first load support downstream with the first pusher mechanism; and ceasing to push the first load support with the first pusher mechanism while continuing to push the first load support downstream with the second pusher mechanism.

19. The method of claim 18 wherein the step of coordinating includes the step of moving the first pusher mechanism upstream to engage a second one of the load supports while continuing to push the first load support downstream with the second pusher mechanism.

20. The method of claim 19 wherein the step of coordinating includes the step of pushing the second load support downstream with the first pusher mechanism while continuing to push the first load support downstream with the second pusher mechanism.

21. The method of claim 20 wherein the step of coordinating includes the step of ceasing to push the first load support with the second pusher mechanism while continuing to push the second and first load supports downstream with the first pusher mechanism.

22. The method of claim 21 wherein the step of coordinating includes the step of moving the second pusher mechanism upstream while continuing to push the second and first load supports downstream with the first pusher mechanism.

23. The method of claim 22 wherein the step of coordinating includes the step of engaging the second load support with the second pusher mechanism while continuing to push the second and first load supports downstream with the first pusher mechanism.

24. The method of claim 23 wherein the step of coordinating includes the step of pushing the second and first load supports downstream with the second pusher mechanism while continuing to push the second and first load supports downstream with the first pusher mechanism.

25. The method of claim 18 wherein the step of pushing includes the step of pushing the load supports and loads thereon through a heating chamber having a gas-tight seal from adjacent the entry end to adjacent the exit end of the furnace section.

26. The method of claim 18 further including the step of removing the load supports from the exit end of the furnace section in a manner to facilitate the continuous movement of the load supports.

27. The method of claim 26 wherein the step of removing includes the step of removing the load supports from the furnace section with a first removal mechanism and removing the loads from the first removal mechanism with a second removal mechanism.

28. The method of claim 27 wherein the step of removing the load supports from the furnace section includes the step of lifting the load supports with the first removal mechanism.

29. The method of claim 28 further including the step of lowering the load supports onto the second removal mechanism with the first removal mechanism.

30. The method of claim 29 wherein the step of removing the load supports from the first removal mechanism includes the step of moving a support member of the second removal mechanism with the load supports thereon in a linear motion.

31. The method of claim 18 wherein the step of pushing comprises the step of sliding each of the load supports on a slide rail within the furnace section in a continuous fashion from adjacent the entry end to adjacent the exit end.

32. The method of claim 18 wherein the step of pushing comprises the step of pushing the load supports with a first pushing surface of a first pusher mechanism so that the first pushing surface is within the furnace section whenever a furnace entry gate is closed between the furnace section and an entry plenum to provide a seal between the furnace section and entry plenum.

33. The method of claim 18 wherein the first pusher mechanism includes an extendable-retractable arm and a first pusher member which is rotatably mounted on the arm to rotate laterally; and the step of pushing comprises the step of pushing the load supports with the first pusher member.

34. The method of claim 33 wherein the second pusher mechanism includes an extendable-retractable arm and a second pusher member which is rotatably mounted on the arm to rotate laterally; and the step of pushing comprises the step of pushing the load supports with the second pusher member.

35. A pusher furnace comprising:
a furnace section having entry and exit ends;
a plurality of load supports adapted to support respective loads to be heated in the furnace section; and
a pusher assembly adjacent the entry end of the furnace section for pushing the load supports to provide continuous downstream movement of the load supports from adjacent the entry end to adjacent the exit end of the furnace section; wherein the pusher assembly includes first and second pusher mechanisms which move in a coordinated manner to provide continuous movement of the load supports through the furnace section;
an entry plenum adjacent the entry end of the furnace section;
a furnace section entrance opening formed between the entry plenum and the furnace section;
a furnace entry gate which is openable to provide communication between the entry plenum and furnace section via the furnace section entrance opening and closable to provide a seal between the entry plenum and furnace section;
a first pushing surface on the first pusher mechanism which engages the load supports during the respective pushing thereof and which is within the furnace section whenever the furnace entry gate is closed; and
a second pushing surface on the second pusher mechanism which engages the load supports during the respective pushing thereof and which is movable within the entry plenum to push the load supports from the entry plenum toward the furnace section entrance opening.

36. The furnace of claim 35 wherein the first pusher mechanism includes an extendable-retractable arm and a first pusher member which is rotatably mounted on the arm to rotate laterally and which selectively engages the load supports.

37. The furnace of claim 35 further comprising:
an entry plenum entrance opening formed between the entry plenum and atmosphere external to the entry plenum;
an entry plenum entry gate which is openable to provide communication between the entry plenum and external atmosphere via the entry plenum entrance opening and closable to provide a seal between the entry plenum and external atmosphere; and
a first pump in communication with the entry plenum for evacuating gas from within the entry plenum.

38. The furnace of claim 37 further comprising an inert gas source; and a second pump in communication with the inert gas source and the entry plenum for pumping inert gas into the entry plenum.

39. A method comprising the steps of:
pushing a plurality of load supports with respective loads thereon in a continuous manner from adjacent an entry end to adjacent an exit end of a furnace section; and
heating the load supports and loads within the furnace section;
wherein the step of pushing comprises the step of pushing the load supports within the furnace section in a non-stop manner with a first pushing surface which is within the furnace section and engages a first one of the load supports throughout a first set of sequential steps comprising:
closing a furnace entry gate to provide a seal between the furnace section and an entry plenum;
opening an entry plenum entry gate while maintaining the furnace entry gate closed to provide a first entrance opening which provides communication between the entry plenum and atmosphere external to the entry plenum;
moving an additional load support through the first entrance opening from the external atmosphere into the entry plenum while maintaining the furnace entry gate closed;
closing the plenum entry gate to provide a seal between the entry plenum and external atmosphere while maintaining the furnace entry gate closed;
evacuating gas from the entry plenum while maintaining both gates closed;
opening the furnace entry gate while maintaining the plenum entry gate closed to provide a second entrance opening which provides communication between the entry plenum and furnace section; and
pushing the additional load support with a second pushing surface through the second entrance opening from the entry plenum into the furnace section while maintaining the plenum entry gate closed so that the additional load support abuts the first load support whereby the second pushing surface begins pushing the load supports through the furnace section to maintain the continuous manner of pushing.

40. The method of claim 39 wherein the first set of sequential steps further comprises, after the step of closing the plenum entry gate and before the step of opening the furnace entry gate, the step of conveying an inert gas into the entry plenum while maintaining both gates closed.

41. The method of claim 39 further comprising, after the first set of sequential steps, a second set of sequential steps comprising:
ceasing to push the first load support with the first pushing surface while continuing to push the load supports with the second pushing surface while maintaining the plenum entry gate closed and the furnace entry gate open;
pushing the additional load support within the furnace section with the first pushing surface engaging the additional load support while maintaining the plenum entry gate closed and the furnace entry gate open;
ceasing to push the additional load support with the second pushing surface while continuing to push the load supports with the first pushing surface while maintaining the plenum entry gate closed and the furnace entry gate open;
retracting the second pushing surface within the entry plenum away from the furnace section while maintaining the plenum entry gate closed; and
closing the furnace entry gate to provide a seal between the entry plenum and furnace section.

* * * * *